United States Patent
Lee (10) Patent No.: US 12,539,858 B2
(45) Date of Patent: Feb. 3, 2026

(54) APPARATUS AND METHOD FOR DETERMINING CUT-IN OF VEHICLE

(71) Applicants: Hyundai Motor Company, Seoul (KR); Kia Corporation, Seoul (KR)

(72) Inventor: Nam Hyung Lee, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 196 days.

(21) Appl. No.: 17/892,743

(22) Filed: Aug. 22, 2022

(65) Prior Publication Data

US 2023/0150500 A1 May 18, 2023

(30) Foreign Application Priority Data

Nov. 18, 2021 (KR) .................. 10-2021-0159631

(51) Int. Cl.
| | |
|---|---|
| *B60W 30/16* | (2020.01) |
| *B60W 40/04* | (2006.01) |
| *G01S 17/08* | (2006.01) |
| *G01S 17/89* | (2020.01) |
| *G01S 17/931* | (2020.01) |
| *G06N 3/02* | (2006.01) |

(52) U.S. Cl.
CPC ............ *B60W 30/16* (2013.01); *B60W 40/04* (2013.01); *G01S 17/08* (2013.01); *G01S 17/89* (2013.01); *G01S 17/931* (2020.01); *G06N 3/02* (2013.01); *B60W 2420/408* (2024.01); *B60W 2554/80* (2020.02)

(58) Field of Classification Search
CPC .............. B60W 30/16; B60W 40/04; B60W 2420/408; B60W 2554/80; B60W 60/0027; B60W 40/02; B60W 30/08; B60W 2552/50; G01S 17/08; G01S 17/89; G01S 17/931; G01S 7/4802; G06N 3/02; G06N 3/044; G06N 3/045; G06N 3/08

See application file for complete search history.

(56) References Cited

U.S. PATENT DOCUMENTS

| | | | |
|---|---|---|---|
| 9,778,364 B2 | 10/2017 | Gruver et al. | |
| 2020/0249324 A1* | 8/2020 | Steinberg | ............... G01S 7/497 |
| 2022/0204038 A1* | 6/2022 | Seo | ......................... G01S 17/89 |
| 2022/0270282 A1* | 8/2022 | Akutsu | ..................... G06T 7/70 |
| 2023/0015357 A1* | 1/2023 | Kim | ..................... G06V 10/751 |

FOREIGN PATENT DOCUMENTS

| | | |
|---|---|---|
| KR | 10-2129498 B1 | 7/2020 |
| KR | 10-2155054 B1 | 9/2020 |

* cited by examiner

*Primary Examiner* — Aniss Chad
*Assistant Examiner* — Chase L Cooley
(74) *Attorney, Agent, or Firm* — Fox Rothschild LLP (57) ABSTRACT

Disclosed are an apparatus and method for determining a cut-in of a vehicle. The apparatus includes a sensor that detects surroundings of the vehicle to generate a point cloud, and a controller that calculates a distance from a starting point to an obstacle based on the point cloud, calculates a distance ratio based on the distance to the obstacle, analyzes the distance ratio by using an artificial neural network, and determines whether a surrounding vehicle cuts in and a cut-in direction. Therefore, it is possible to quickly and accurately determine a cut-in vehicle by minimizing the operation load and increasing the accuracy of the determination performance.

14 Claims, 10 Drawing Sheets

… (1) APPARATUS AND METHOD FOR DETERMINING CUT-IN OF VEHICLE

CROSS-REFERENCE TO RELATED APPLICATION

This application is based on and claims under 35 U.S.C. § 119(a) the benefit of Korean Patent Application No. 10-2021-0159631, filed in the Korean Intellectual Property Office on Nov. 18, 2021, the entire contents of which are incorporated herein by reference.

TECHNICAL FIELD

Embodiments of the present disclosure relate to an apparatus and method for determining a cut-in of a vehicle.

DESCRIPTION OF RELATED ART

When a vehicle is driven using an ADAS or is driven by autonomous driving, it is important to quickly recognize a surrounding vehicle that cuts in the front of the vehicle. Because the distance between the surrounding vehicle to be cut-in and the host vehicle is several meters, when the cut-in of the surrounding vehicle is not immediately recognized, an accident may occur.

Accordingly, in the related art, a technique for determining a cut-in of a surrounding vehicle based on track information of a front vehicle obtained by fusion of a plurality of sensors to determine a driving situation has been proposed. However, when erroneous track information is output, it may affect the cut-in determination logic of the surrounding vehicle, so that the vehicle is not braked even in a cut-in situation or is braked even when it is not a cut-in situation, thereby making the occupants uncomfortable.

Recently, as research on artificial intelligence such as deep learning and reinforcement learning is active, a technology for determining a driving situation using information obtained by a vehicle camera or radar and artificial intelligence has been developed. However, when the image obtained through a camera of a vehicle is input to a deep learning program, the computational load is large, and it is difficult to obtain high-resolution input data only with the information obtained through radar, so that there is a high possibility of not recognizing or misrecognizing a low-speed cut-in vehicle.

SUMMARY

Embodiments of the present disclosure have been made to solve the above-mentioned problems occurring in the prior art while advantages achieved by the prior art are maintained intact.

An embodiment of the present disclosure provides an apparatus and method for determining a cut-in capable of accurately determining a cut-in vehicle by using an artificial neural network based on information obtained through a lidar.

The technical problems to be solved by embodiments of the present disclosure are not limited to the aforementioned problems, and any other technical problems not mentioned herein will be clearly understood from the following description by those skilled in the art to which embodiments of the present disclosure pertain.

According to an embodiment of the present disclosure, an apparatus for determining a cut-in of a vehicle includes a sensor that detects surroundings of the vehicle to generate a point cloud, and a controller that calculates a distance from a starting point to an obstacle based on the point cloud, calculates a distance ratio based on the distance to the obstacle, analyzes the distance ratio by using an artificial neural network, and determines whether a surrounding vehicle cuts in and a cut-in direction.

The sensor may include a lidar that outputs a laser to the surroundings of the vehicle.

The controller may set a detection area located within a specified distance and a specified angle from the sensor and extract a detection area point cloud included in the detection area from among the point clouds.

The controller may calculate a first length, which is a length from the starting point to an end point, based on the extracted detection area point cloud.

The controller may calculate a second length of the detection area, which is a distance from the starting point to the obstacle, based on the extracted detection area point cloud when the obstacle exists in the detection area.

The controller may calculate a value obtained by dividing the second length by the first length as the distance ratio.

The controller may calculate the distance ratio for each specific angle within the detection area and generate an input vector by processing the distance ratio.

The artificial neural network may include a long short-term memory (LSTM).

The controller may determine one of a right cut-in of the surrounding vehicle, a left cut-in of the surrounding vehicle, and non-occurrence of a cut-in of the surrounding vehicle based on a result analyzed by using the artificial neural network.

According to another embodiment of the present disclosure, a method of determining a cut-in of a vehicle includes detecting, by a sensor, surroundings of the vehicle to generate a point cloud by sensing the surroundings of the vehicle, calculating a distance from a starting point to an obstacle based on the point cloud, calculating a distance ratio based on the distance to the obstacle, and analyzing the distance ratio by using an artificial neural network to determine whether a surrounding vehicle cuts in and a cut-in direction.

The sensor may include a lidar that outputs a laser to the surroundings of the vehicle.

The method may further include setting a detection area located within a specified distance and a specified angle from the sensor and extracting a detection area point cloud included in the detection area from among the point clouds.

The method may further include calculating a first length, which is a length from the starting point to an end point, based on the extracted detection area point cloud.

The method may further include calculating a second length of the detection area, which is a distance from the starting point to the obstacle, based on the extracted detection area point cloud when the obstacle exists in the detection area.

The calculating of the distance ratio may include calculating a value obtained by dividing the second length by the first length as the distance ratio.

The method may further include calculating the distance ratio for each specific angle within the detection area and generate an input vector by processing the distance ratio.

The artificial neural network may include a long short-term memory (LSTM).

The method may further include determining one of a right cut-in of the surrounding vehicle, a left cut-in of the surrounding vehicle, and non-occurrence of a cut-in of the surrounding vehicle based on a result analyzed by using the artificial neural network.

As discussed, the method and system suitably include use of a controller or processer.

In another aspect, vehicles are provided that comprise an apparatus as disclosed herein.

In a fully autonomous vehicle or system, the vehicle may perform all driving tasks under all conditions and little or no driving assistance is required a human driver. In semi-autonomous vehicle, for example, the automated driving system may perform some or all parts of the driving task in some conditions, but a human driver regains control under some conditions, or in other semi-autonomous systems, the vehicle's automated system may oversee steering and accelerating and braking in some conditions, although the human driver is required to continue paying attention to the driving environment throughout the journey, while also performing the remainder of the necessary tasks.

In certain embodiments, the present systems and vehicles may be fully autonomous. In other certain embodiments, the present systems and vehicles may be semi-autonomous.

BRIEF DESCRIPTION OF THE DRAWINGS

The above and other objects, features and advantages of embodiments of the present disclosure will be more apparent from the following detailed description taken in conjunction with the accompanying drawings.

DETAILED DESCRIPTION

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of the related known configuration or function will be omitted when it is determined that it interferes with the understanding of the embodiment of the present disclosure.

In describing the components of the embodiment according to the present disclosure, terms such as first, second, A, B, (a), (b), and the like may be used. These terms are merely intended to distinguish the components from other components, and the terms do not limit the nature, order or sequence of the components. Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation and can be implemented by hardware components or software components and combinations thereof.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Figure 1:
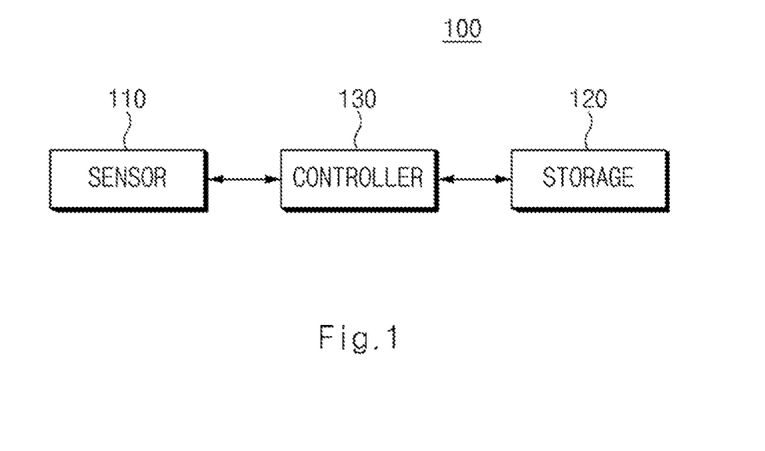
FIG. 1 is a block diagram illustrating an apparatus for determining a cut-in of a vehicle according to an embodiment of the present disclosure.

FIG. 1 is a block diagram illustrating an apparatus for determining a cut-in of a vehicle according to an embodiment of the present disclosure.

As shown in FIG. 1, an apparatus 100 for determining a cut-in of a vehicle may include a sensor 110, storage 120 and a controller 130.

The sensor 110 may output a laser to the periphery of the vehicle and may generate a point cloud at a point where the laser reaches. According to an embodiment, the sensor 110 may include a lidar.

The storage 120 may store at least one algorithm for performing operations or executions of various commands for the operation of an apparatus for determining a cut-in of a vehicle according to an embodiment of the present disclosure. The storage 120 may include at least one storage medium of a flash memory, a hard disk, a memory card, a read-only memory (ROM), a random access memory (RAM), an electrically erasable programmable read-only memory (EEPROM), a programmable read-only memory (PROM), a magnetic memory, a magnetic disk, and an optical disk.

The controller 130 may be implemented with various processing devices such as a microprocessor and the like in which a semiconductor chip capable of performing operations or executions of various commands is built-in and may control operations of the apparatus for determining a cut-in of a vehicle according to an embodiment of the present disclosure.

The controller 130 may set a detection area (Field of View (FOV)) located within a specified distance and a specified angle from the sensor 110 and extract a detection area point cloud included in the detection area from the point clouds generated by the sensor 110. For a more detailed description, refer to FIG. 2.

Figure 2:
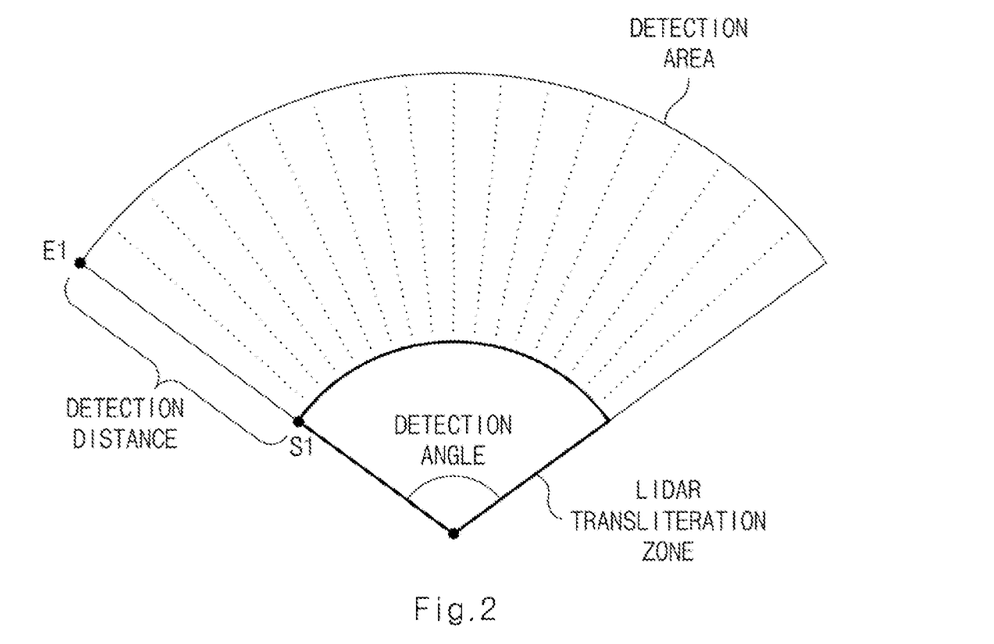
FIG. 2 is a diagram schematically illustrating a detection area according to an embodiment of the present disclosure.

FIG. 2 is a diagram schematically illustrating a detection area according to an embodiment of the present disclosure.

As shown in FIG. 2, the controller 130 may set a detection area (FOV) located within a specified distance and a specified angle from the sensor 110. The detection area may include a fan-shaped area excluding a shadow area of the lidar. The detection area may have a detection distance from a starting point S1 reached by the laser to an end point E1 reachable by the laser and may have a detection angle of a specified angle.

When an obstacle exists in the detection area, the controller 130 may calculate a distance from the starting point to the obstacle. For a more detailed description, refer to FIGS. 3 and 4.

Figure 3:
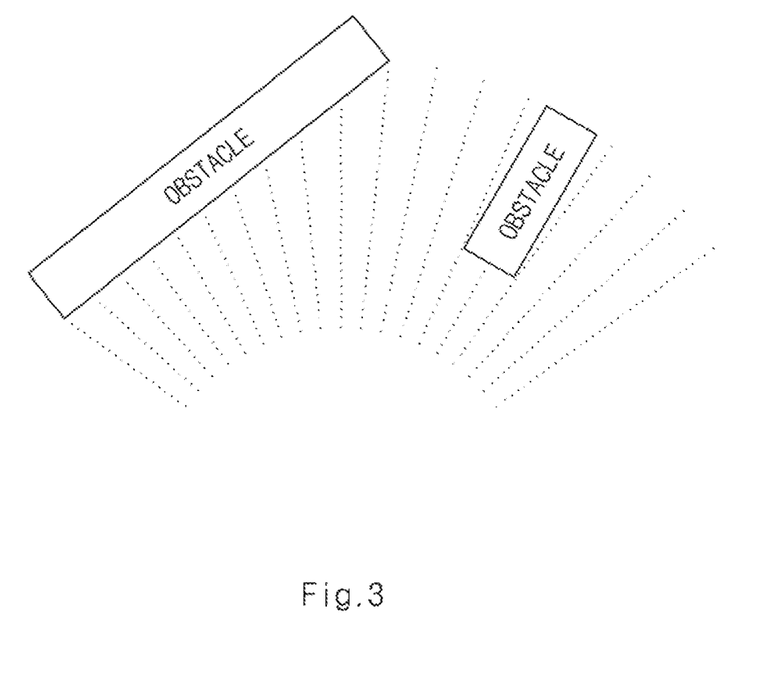
FIG. 3 is a diagram schematically illustrating an obstacle located in a detection area according to an embodiment of the present disclosure.
Figure 4:
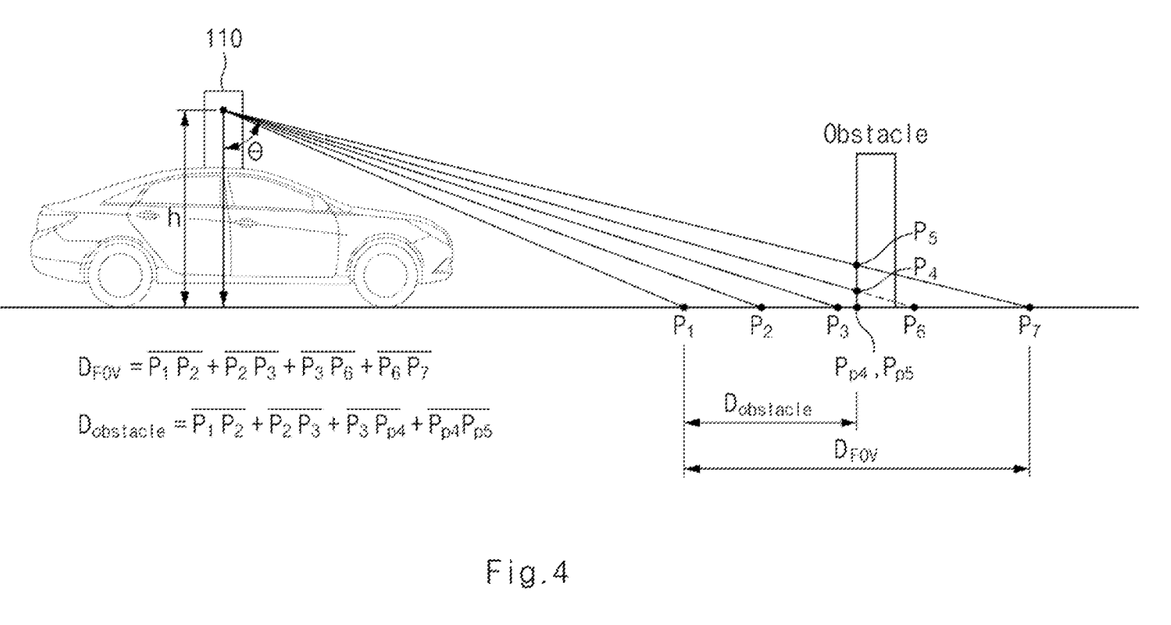
FIG. 4 is a diagram schematically illustrating a scheme of determining whether an obstacle exists and calculating a distance to the obstacle according to an embodiment of the present disclosure.

FIG. 3 is a diagram schematically illustrating an obstacle located in a detection area according to an embodiment of the present disclosure. FIG. 4 is a diagram schematically illustrating a scheme of determining whether an obstacle exists and calculating a distance to the obstacle according to an embodiment of the present disclosure.

As shown in FIG. 3, the sensor 110 may generate a point cloud up to a point reachable by the laser. That is, because the laser can reach only to a point where no obstacles exist, the sensor 110 cannot generate a point cloud in an area where an obstacle is located and may generate a point cloud up to an area where any obstacles are not located. Accordingly, the controller 130 may determine that the obstacle is located in an area where the point cloud is not generated.

As shown in FIG. 4, when it is assumed that a starting point reached by the laser is P1 and an end point reachable by the laser is P7, the controller 130 may set P1 to P7 as a detection distance $D_{FOV}$.

When an obstacle exists in the detection area, the laser output from the sensor 110 may reach the surface of the obstacle to generate a point. According to an embodiment, the points may include P1, P2, P3, $P_{p4}$, $P_{p5}$, P4 and P5. When there are no obstacles in the detection area, the laser may reach the bottom surface to generate a point. According to an embodiment, the points may include P1, P2, P3, P6 and P7.

When an obstacle exists, the controller 130 may define a distance from the starting point P1 to the point $P_{p5}$ at which the laser reaches the obstacle as $D_{obstacle}$. The $D_{obstacle}$ may be calculated by following Equation 1.

$$D_{obstacle} = \text{Line segment}P1P2 + \text{Line segment}P2P3 + \text{Line segment}P3P_{p4} + \text{Line segment}P_{p4}P_{p5} \qquad \text{<Equation 1>}$$

(where the line segment $P_{p4} P_{p5}$ may be excluded from the Equation 1)

The controller 130 may define the distance from the starting point P1 to the end point P7 as the detection distance $D_{FOV}$, and the detection distance $D_{FOV}$ may be calculated by following Equation 2.

$$D_{FOV} = \text{Line segment}P1P2 + \text{Line segment}P2P3 + \text{Line segment}P3P6 + \text{Line segment}P6P7 \qquad \text{<Equation 2>}$$

When there is no obstacle, the controller 130 has no point at which the laser reaches the obstacle and the laser reaches the end point P7, so that the $D_{obstacle}$ has a value similar to the $D_{FOV}$.

According to the embodiment, the controller 130 may calculate line segment PnPn+1 of Equations 1 and 2 based on a height 'h' where the sensor 110 is located from the ground, and an angle θ between the line connecting the sensor 110 and the ground and the output laser.

The controller 130 may calculate distance ratio $D_{Ratio}$ by using following Equation 3 based on $D_{obstacle}$ and $D_{FOV}$.

$$D_{Ratio} = D_{obstacle}/D_{FOV} \qquad \text{<Equation 3>}$$

When there is no obstacle, the controller 130 may calculate $D_{obstacle}$ of which the value is similar to that of $D_{FOV}$, so that the distance ratio $D_{Ratio}$ is calculated as a value close to '1'. When there is an obstacle, the distance ratio $D_{Ratio}$ may be calculated as a value between '0' and '1'. Accordingly, when the distance ratio $D_{Ratio}$ is calculated as a value close to '0', the controller 130 may determine that the obstacle is located close to the host vehicle. When the distance ratio $D_{Ratio}$ is calculated as a value close to '1', the controller 130 may determine that the obstacle is located far from the host vehicle.

Figure 5A:
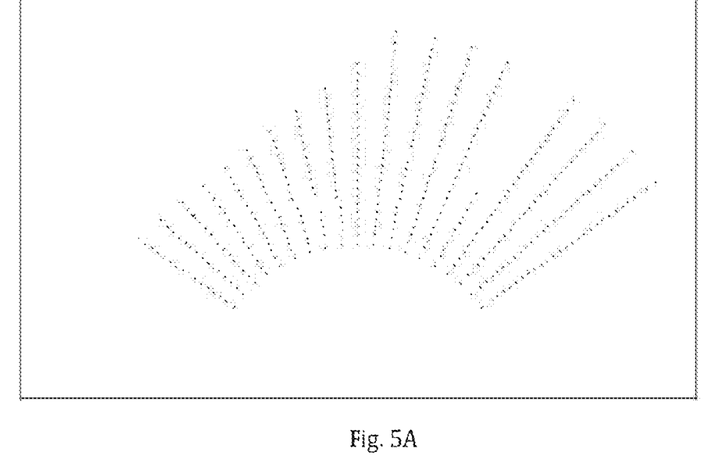
FIG. 5A is a diagram illustrating a point cloud extracted within a detection area.
Figure 5B:
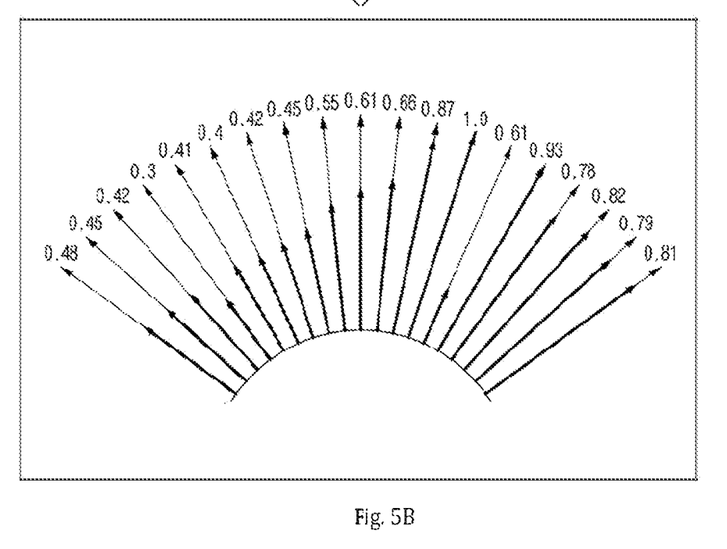
FIG. 5B is a diagram illustrating a distance ratio calculated according to an embodiment of the present disclosure.

The controller 130 may calculate a distance ratio for each specific angle within the detection area, process the distance ratio, and generate an input vector that is data input to the artificial neural network. For a more detailed description, refer to FIG. 5.

FIG. 5A is a diagram illustrating a point cloud extracted within a detection area. FIG. 5B is a diagram illustrating a distance ratio calculated according to an embodiment of the present disclosure.

As shown in FIGS. 5A and 5B, the controller 130 may calculate 19 distance ratios $D_{Ratio}$ based on the point cloud extracted in the detection area and generate an input vector based on 19 distance ratios. The input vector may include information on the existence of a surrounding vehicle and a distance to the surrounding vehicle and may mean a normalized value.

Figure 6A:
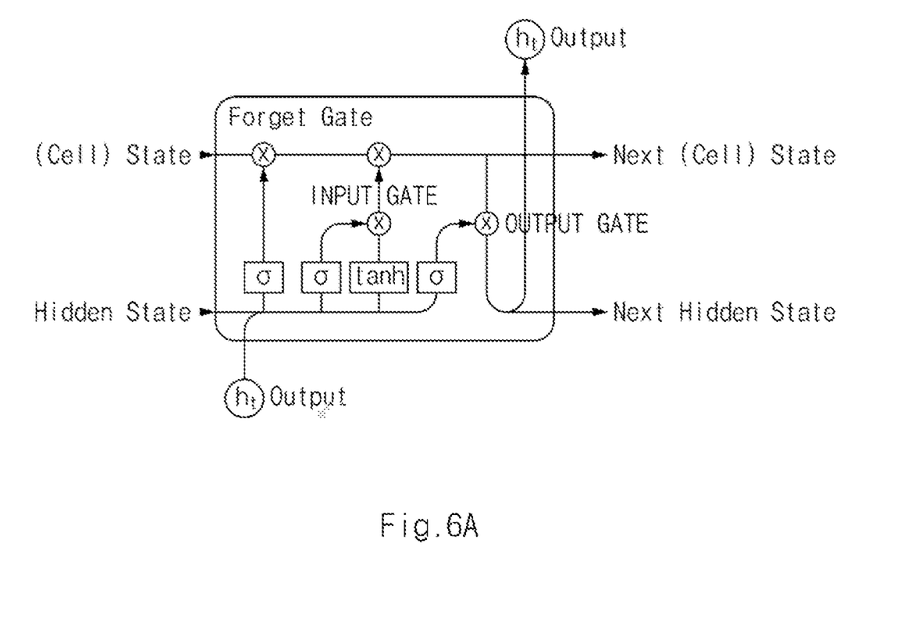
FIGS. 6A and 6B are diagrams illustrating an LSTM structure applied according to an embodiment of the present disclosure.
Figure 6B:
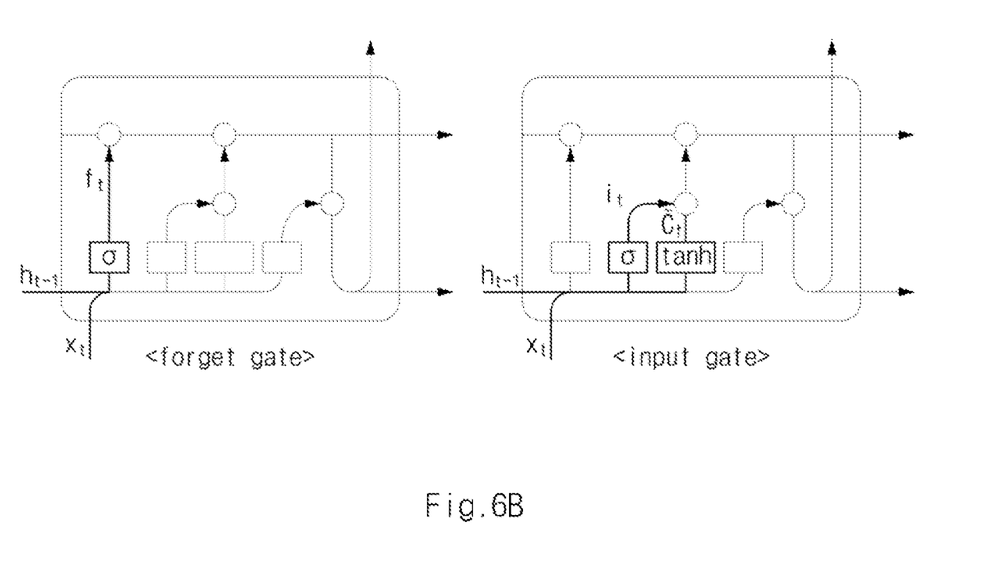

The controller 130 may input an input vector to the artificial neural network and determine whether a cut-in of a surrounding vehicle occurs and a cut-in direction based on a result analyzed using the artificial neural network. For more detailed description, refer to FIGS. 6 to 7.

Figure 7:
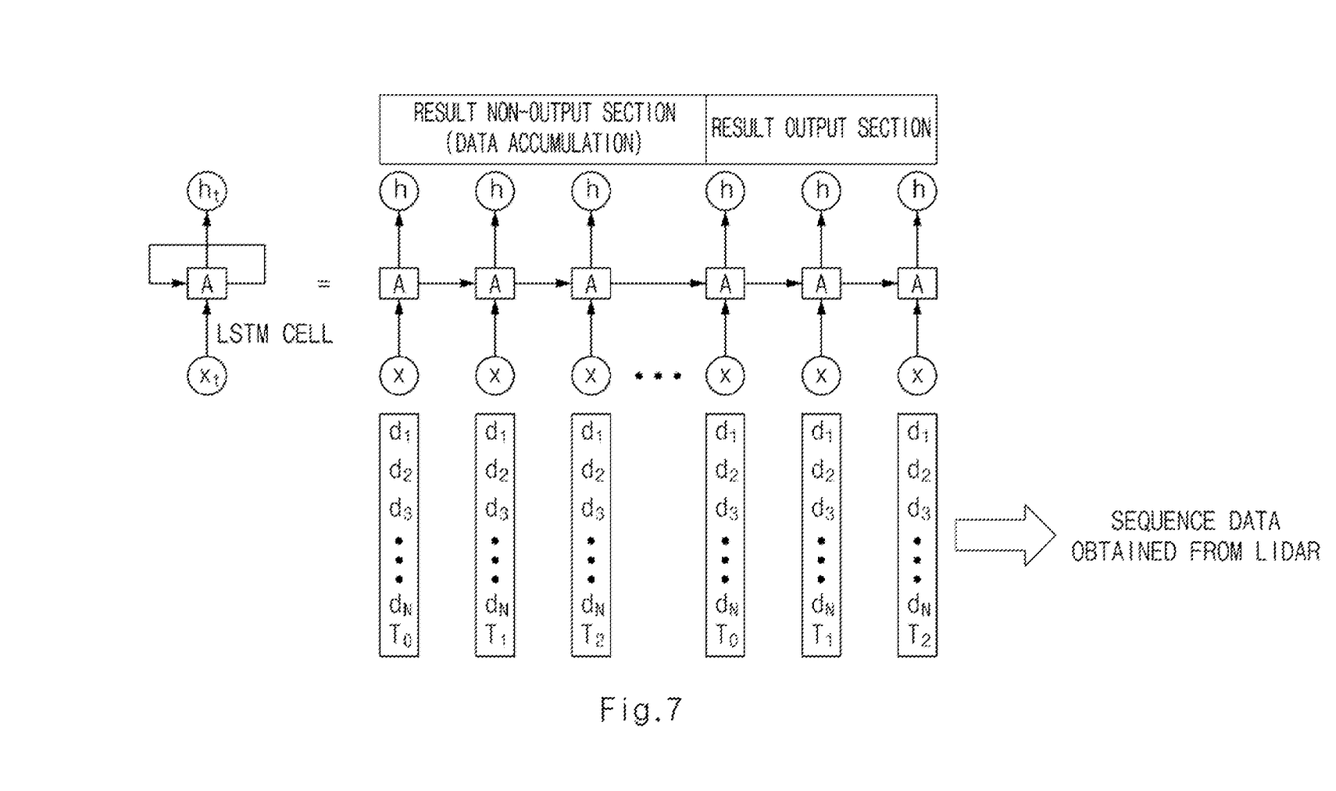
FIG. 7 is a diagram schematically illustrating data input and output of an LSTM according to an embodiment of the present disclosure.

FIGS. 6A and 6B are diagrams illustrating an LSTM structure applied according to an embodiment of the present disclosure. FIG. 7 is a diagram schematically illustrating data input and output of an LSTM according to an embodiment of the present disclosure.

As shown in FIGS. 6A and 6B, the artificial neural network according to an embodiment of the present disclosure may include a long short term memory (LSTM). The artificial neural network according to an embodiment of the present disclosure may include a forget gate, an input gate, and an output gate.

When the previous output $h_{t-1}$ and the current input $x_t$ are input, the forget gate may apply a sigmoid function to calculate an output value $f_t$ and outputs it as a cell state. In this case, the output range of the sigmoid function may have a value between '0' and '1'. When the output value is '1', the value $C_{t-1}$ of the previous cell state may be maintained, and when the output value is '0', the value of the previous cell state may be forgotten.

The input gate is a gate for storing current information. When the previous output $h_{t-1}$ and the current input $x_t$ are input, the input gate may apply the sigmoid function to output $i_t$ and apply the hyperbolic tangent to output $\tilde{C}_t$ through the Hadamard product operation, where the $i_t$ has a value between '0' and '1', and $\tilde{C}_t$ has a value between '−1' and '1'.

The output gate is a gate for outputting the final result $h_t$, and the value obtained the Hadamard product operation by applying the hyperbolic tangent of the cell state is the final output value.

The LSTM may additionally input the output value output from one time step and the current information to a next time step and may output the final output value by repeating input and output of data over a plurality of time steps.

As shown in FIG. 7, when the time series data output from the sensor 110 is sequentially inputted over time step $T_0$ to time step $T_{N-1}$ and accumulated, the controller 130 may determine whether a cut-in occurs and the cut-in direction based on the result values output at time steps $T_n$, $T_{n+1}$ and $T_{n+2}$ and based on the location of the surrounding vehicle.

According to an embodiment, the controller 130 may perform softmax operation on the result value output at each time step, and then output the final determination value through Argmax. For example, when the softmax operation value is [0.12 0.09 0.79], the Argmax value is output as [0 0 1], and it may be determined that the surrounding vehicle is cut in from the right side. In addition, when the softmax operation value is [0.11 0.82 0.07], the Argmax value is output as [0 1 0], and it may be determined that the surrounding vehicle is cut in from the left side. In addition, when the softmax operation value is [0.75 0.14 0.11], the Argmax value is output as [1 0 0], and it may be determined that the cut-in of the surrounding vehicle has not occurred.

Figure 8:
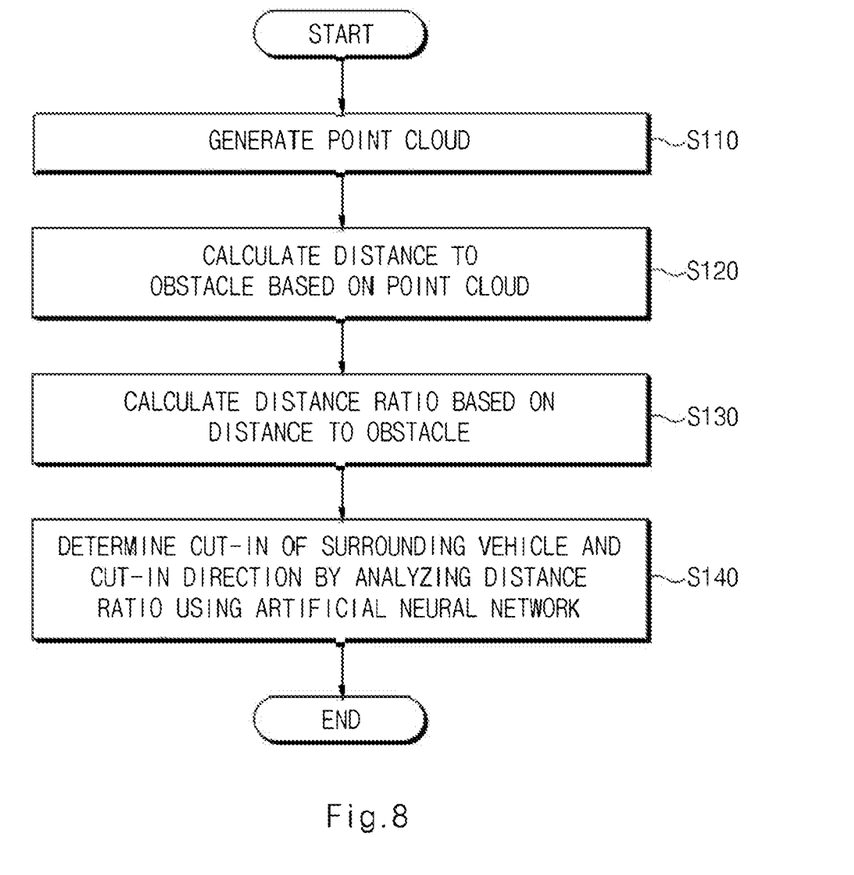
FIG. 8 is a flowchart illustrating a method of determining a cut-in of a vehicle according to an embodiment of the present disclosure.

FIG. 8 is a flowchart illustrating a method of determining a cut-in of a vehicle according to an embodiment of the present disclosure.

As shown in FIG. 8, in S110, the sensor 110 may output a laser to the vicinity of a vehicle and may generate a point cloud at a point where the laser reaches. According to an embodiment, the sensor 110 may include a lidar.

In S120, the controller 130 may calculate the distance to an obstacle based on the point cloud. In S120, the controller 130 may set a detection area FOV located within a specified distance and a specified angle from the sensor 110. When an obstacle exists in the detection area, the controller 130 may calculate the distance from the starting point in the detection area to the obstacle. For a more detailed description, refer to FIGS. 3 and 4.

In S120, as shown in FIG. 4, the controller 130 may define the distance from the starting point P1 in the detection area to the point P5 at which the laser reaches the obstacle as $D_{obstacle}$ and may calculate the $D_{obstacle}$ by Equation 1. In addition, as shown in FIG. 4, the controller 130 may define the distance from the starting point P1 to the end point P7 as detection distance $D_{FOV}$ and calculate the $D_{FOV}$ by Equation 2.

In S130, the controller 130 may calculate a distance ratio $D_{Ratio}$ based on the distance to the obstacle. In S130, the controller 130 may calculate the distance ratio $D_{Ratio}$ by Equation 3 based on the $D_{obstacle}$ and the $D_{FOV}$ calculated in S120.

In S130, when there is no obstacle, the controller 130 may calculate a value close to '1' as the distance ratio $D_{Ratio}$ because the $D_{obstacle}$ is calculated similar to the $D_{FOV}$. When there is an obstacle, the distance ratio $D_{Ratio}$ may be calculated as a value between '0' and '1'. Accordingly, when the distance ratio $D_{Ratio}$ is calculated as a value close to '0', the controller 130 may determine that the obstacle is located close to the host vehicle. When the distance ratio $D_{Ratio}$ is calculated as a value close to '1', the controller 130 may determine that the obstacle is located far from the host vehicle.

In S140, the controller 130 may analyze the distance ratio by using an artificial neural network and determine whether a surrounding vehicle cuts in and the cut-in direction.

In S140, the controller 130 may generate an input vector to be input to the artificial neural network based on the calculated distance ratio. The input vector may include information on the existence of a surrounding vehicle and a distance to the surrounding vehicle and may mean a normalized value. In this case, the artificial neural network may include a long short term memory (LSTM).

In S140, when the time series data output from the sensor 110 is sequentially inputted over time step $T_0$ to time step $T_{N-1}$ and accumulated, the controller 130 may determine whether a cut-in occurs and the cut-in direction based on the result values output at time steps $T_n$, $T_{n+1}$ and $T_{n+2}$ and based on the location of the surrounding vehicle.

According to an embodiment, the controller 130 may perform softmax operation on the result value output at each time step, and then output the final determination value through Argmax. For example, when the softmax operation value is [0.12 0.09 0.79], the Argmax value is output as [0 0 1], and it may be determined that the surrounding vehicle is cut in from the right side. In addition, when the softmax operation value is [0.11 0.82 0.07], the Argmax value is output as [0 1 0], and it may be determined that the surrounding vehicle is cut in from the left side. In addition, when the softmax operation value is [0.75 0.14 0.11], the Argmax value is output as [1 0 0], and it may be determined that the cut-in of the surrounding vehicle has not occurred.

Figure 9:
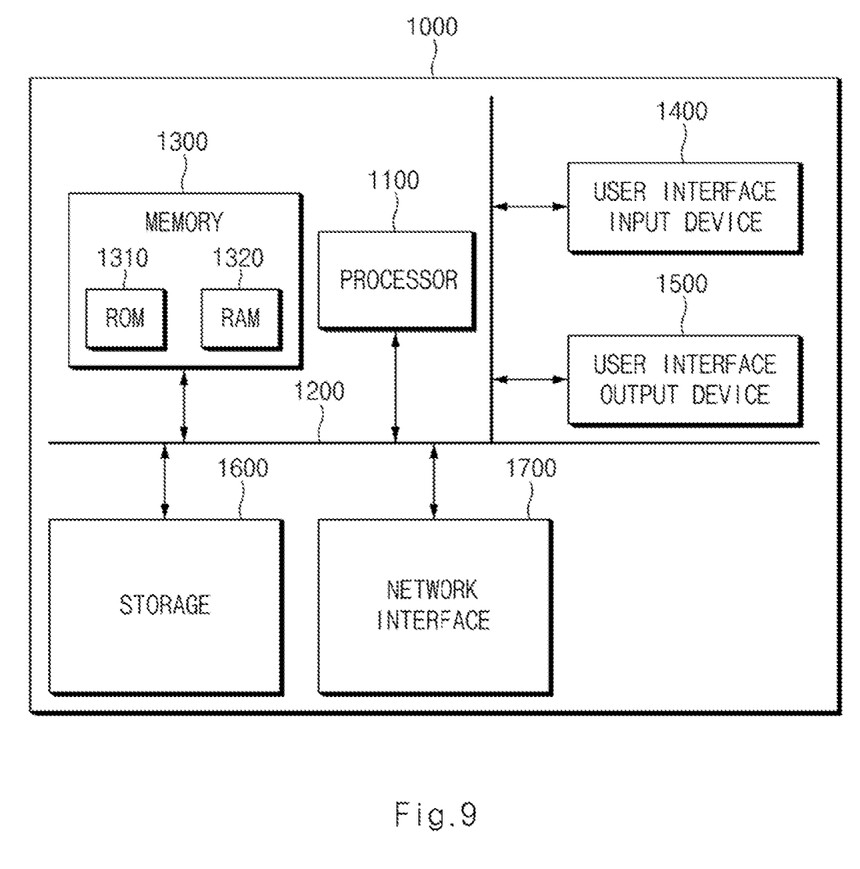
FIG. 9 is a block diagram illustrating a computing system for executing a method according to an embodiment of the present disclosure.

FIG. 9 is a block diagram illustrating a computing system for executing a method according to an embodiment of the present disclosure.

Referring to FIG. 9, a computing system 1000 may include at least one processor 1100, a memory 1300, a user interface input device 1400, a user interface output device 1500, storage 1600, and a network interface 1700 connected through a bus 1200.

The processor 1100 may be a central processing device (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) 1310 and a RAM (Random Access Memory) 1320.

Accordingly, the processes of the method or algorithm described in relation to the embodiments of the present disclosure may be implemented directly by hardware executed by the processor 1100, a software module, or a combination thereof. The software module may reside in a storage medium (that is, the memory 1300 and/or the storage 1600), such as a RAM, a flash memory, a ROM, an EPROM, an EFPROM, a register, a hard disk, solid state drive (SSD), a detachable disk, or a CD-ROM. The exemplary storage medium is coupled to the processor 1100, and the processor 1100 may read information from the storage medium and may write information in the storage medium. In another method, the storage medium may be integrated with the processor 1100. The processor and the storage medium may reside in an application specific integrated circuit (ASIC). The ASIC may reside in a user terminal. In another method, the processor and the storage medium may reside in the user terminal as an individual component.

The apparatus and method for determining a cut-in of a vehicle according to an embodiment of the present disclosure may use an artificial neural network based on information obtained by a lidar to minimize computational load and increase the accuracy of determination performance to quickly and accurately determine a cut-in vehicle.

Although exemplary embodiments of the present disclosure have been described for illustrative purposes, those skilled in the art will appreciate that various modifications, additions and substitutions are possible, without departing from the scope and spirit of the disclosure.

Therefore, the exemplary embodiments disclosed in the present disclosure are provided for the sake of descriptions, not limiting the technical concepts of the present disclosure, and it should be understood that such exemplary embodiments are not intended to limit the scope of the technical concepts of the present disclosure. The protection scope of the present disclosure should be understood by the claims below, and all the technical concepts within the equivalent scopes should be interpreted to be within the scope of the right of the present disclosure.

What is claimed is:

1. An apparatus for determining a cut-in of a vehicle, the apparatus comprising:
   a sensor configured to detect surroundings of the vehicle to generate a point cloud, wherein the sensor comprises a lidar configured to output a laser to the surroundings of the vehicle; and
   a controller configured to:
      calculate a distance from a starting point to an obstacle based on the point cloud,
      calculate a distance ratio based on the distance to the obstacle,
      analyze the distance ratio by using an artificial neural network,
      determine whether a surrounding vehicle cuts in and a cut-in direction;
      set a detection area of the sensor having a detection distance and a detection angle from the sensor, wherein the detection area includes a fan-shaped area excluding a shadow area of the sensor in the point cloud;
      wherein the starting point is adjacent to the shadow area of the sensor and an end point is apart from the starting point by the detection distance; and
   wherein the controller is further configured to:
      calculate the distance ratio for each specific angle within the detection area; and
      generate an input vector that is input to the artificial neural network by processing the distance ratio,
   wherein the controller is additionally configured to:
      calculate the distance ration based on a sum of distance between a plurality of points that are generated by reaching the output laser on the ground and the obstacle, and
      calculate the distance between the plurality of points based on a height where the sensor is located from the ground and angle between a line and the output laser, wherein the line includes a line connecting the sensor and the ground.

2. The apparatus of claim 1, wherein the controller is further configured to set the detection area located within a specified distance and a specified angle from the sensor and extract a detection area point cloud included in the detection area from among the point clouds.

3. The apparatus of claim 2, wherein the controller is further configured to calculate a first length, which is a length from the starting point to the end point, based on the extracted detection area point cloud.

4. The apparatus of claim 3, wherein the controller is further configured to calculate a second length of the detection area, which is a distance from the starting point to the obstacle, based on the extracted detection area point cloud when the obstacle exists in the detection area.

5. The apparatus of claim 4, wherein the controller is further configured to calculate a value obtained by dividing the second length by the first length as the distance ratio.

6. The apparatus of claim 1, wherein the artificial neural network comprises a long short-term memory (LSTM).

7. The apparatus of claim 6, wherein the controller is further configured to determine one of a right cut-in of the surrounding vehicle, a left cut-in of the surrounding vehicle, and non-occurrence of a cut-in of the surrounding vehicle based on a result analyzed by using the artificial neural network.

8. A method of determining a cut-in of a vehicle, the method comprising:
   detecting, by a sensor, surroundings of the vehicle to generate a point cloud by sensing the surroundings of the vehicle, wherein the sensor comprises a lidar configured to output a laser to the surroundings of the vehicle;
   calculating, by a controller, a distance from a starting point to an obstacle based on the point cloud;
   calculating, by the controller, a distance ratio based on the distance to the obstacle; and analyzing, by the controller, the distance ratio by using an artificial neural network to determine whether a surrounding vehicle cuts in and a cut-in direction;

setting, by the controller, a detection area of the sensor having a detection distance and a detection angle from the sensor, wherein the detection area includes a fan-shaped area excluding a shadow area of the sensor in the point cloud;

wherein the starting point is adjacent to the shadow area of the sensor and an end point is apart from the starting point by the detection distance; and wherein the controller is further configured to:
    calculate the distance ratio for each specific angle within the detection area; and
    generate an input vector that is input to the artificial neural network by processing the distance ratio,
wherein the controller is additionally configured to:
    calculate the distance ratio based on a sum of distance between a plurality of points that are generated by reaching output laser on the ground and the obstacle; and
    calculate the distance between the plurality of points based on a height where the sensor is located from the ground and angle between a line and the output laser, wherein the line includes a line connecting the sensor and the ground.

9. The method of claim 8, further comprising:
setting the detection area located within a specified distance and a specified angle from the sensor and extracting a detection area point cloud included in the detection area from among the point clouds.

10. The method of claim 9, further comprising:
calculating a first length, which is a length from the starting point to the end point, based on the extracted detection area point cloud.

11. The method of claim 10, further comprising:
calculating a second length of the detection area, which is a distance from the starting point to the obstacle, based on the extracted detection area point cloud when the obstacle exists in the detection area.

12. The method of claim 11, wherein the calculating of the distance ratio comprises:
calculating a value obtained by dividing the second length by the first length as the distance ratio.

13. The method of claim 8, wherein the artificial neural network comprises a long short-term memory (LSTM).

14. The method of claim 13, further comprising:
determining one of a right cut-in of the surrounding vehicle, a left cut-in of the surrounding vehicle, and non-occurrence of a cut-in of the surrounding vehicle based on a result analyzed by using the artificial neural network.

* * * * *